United States Patent
Katariya et al.

(10) Patent No.: US 12,481,664 B2
(45) Date of Patent: *Nov. 25, 2025

(54) MACHINE LEARNING MODEL FOR RECOMMENDING INTERACTION PARTIES

(71) Applicant: Capital One Services, LLC, McLean, VA (US)

(72) Inventors: Dwipam Katariya, McLean, VA (US); Muhammad Uddin, San Bernardino, CA (US); Tania Cruz Morales, Washington, DC (US); Julian Duque, Arlington, VA (US); Kimberly Stockley, Washington, DC (US)

(73) Assignee: Capital One Services, LLC, McLean, VA (US)

( * ) Notice: Subject to any disclaimer, the term of this patent is extended or adjusted under 35 U.S.C. 154(b) by 0 days.

This patent is subject to a terminal disclaimer.

(21) Appl. No.: 18/816,653

(22) Filed: Aug. 27, 2024

(65) Prior Publication Data
US 2024/0419672 A1 Dec. 19, 2024

Related U.S. Application Data

(63) Continuation of application No. 17/820,051, filed on Aug. 16, 2022, now Pat. No. 12,093,266.

(51) Int. Cl.
*G06F 16/00* (2019.01)
*G06F 16/2457* (2019.01)
*G06F 16/2458* (2019.01)

(52) U.S. Cl.
CPC .... *G06F 16/24575* (2019.01); *G06F 16/2477* (2019.01)

(58) Field of Classification Search
CPC .......... G06F 16/24575; G06F 16/2477; G06F 16/9535; G06N 20/00
See application file for complete search history.

(56) References Cited

U.S. PATENT DOCUMENTS

| | | | |
|---|---|---|---|
| 10,163,147 B2 | 12/2018 | Lee et al. | |
| 11,880,880 B1* | 1/2024 | Liu | G06Q 30/0633 |
| 2009/0271246 A1 | 10/2009 | Alvarez et al. | |
| 2017/0199938 A1* | 7/2017 | Franklin | G06F 16/9535 |
| 2018/0174205 A1 | 6/2018 | Kim et al. | |
| 2021/0160244 A1* | 5/2021 | Carnahan | H04L 63/205 |

(Continued)

*Primary Examiner* — Alexander Khong
(74) *Attorney, Agent, or Firm* — Harrity & Harrity, LLP

(57) ABSTRACT

In some implementations, a system may receive interaction data associated with interactions between a user and subsets of a plurality of interaction parties. The system may store the interaction data and the as historical interaction data associated with historical interactions of the user. The system may provide the historical interaction data as input to a machine learning model, which may be trained using supervised learning and the historical interactions of the user or historical interactions of one or more other users with one or more of the plurality of interaction parties. The system may receive an output, based on applying the machine learning model to the historical interaction data, that may indicate one or more recommended interaction parties based at least in part on one or more factors, wherein the one or more recommended parties may be local entities local to a geographic location associated with the user.

20 Claims, 6 Drawing Sheets

(56) References Cited

U.S. PATENT DOCUMENTS

| | | | |
|---|---|---|---|
| 2023/0052638 A1* | 2/2023 | Matsuoka | G06Q 10/1097 |
| 2023/0153431 A1* | 5/2023 | Hoyne | G06F 21/56 |
| | | | 726/23 |
| 2023/0267151 A1* | 8/2023 | Chen | G06F 16/3322 |
| | | | 707/706 |
| 2024/0020321 A1* | 1/2024 | Mosenia | G06F 16/24578 |
| 2024/0061845 A1 | 2/2024 | Katariya et al. | |

* cited by examiner

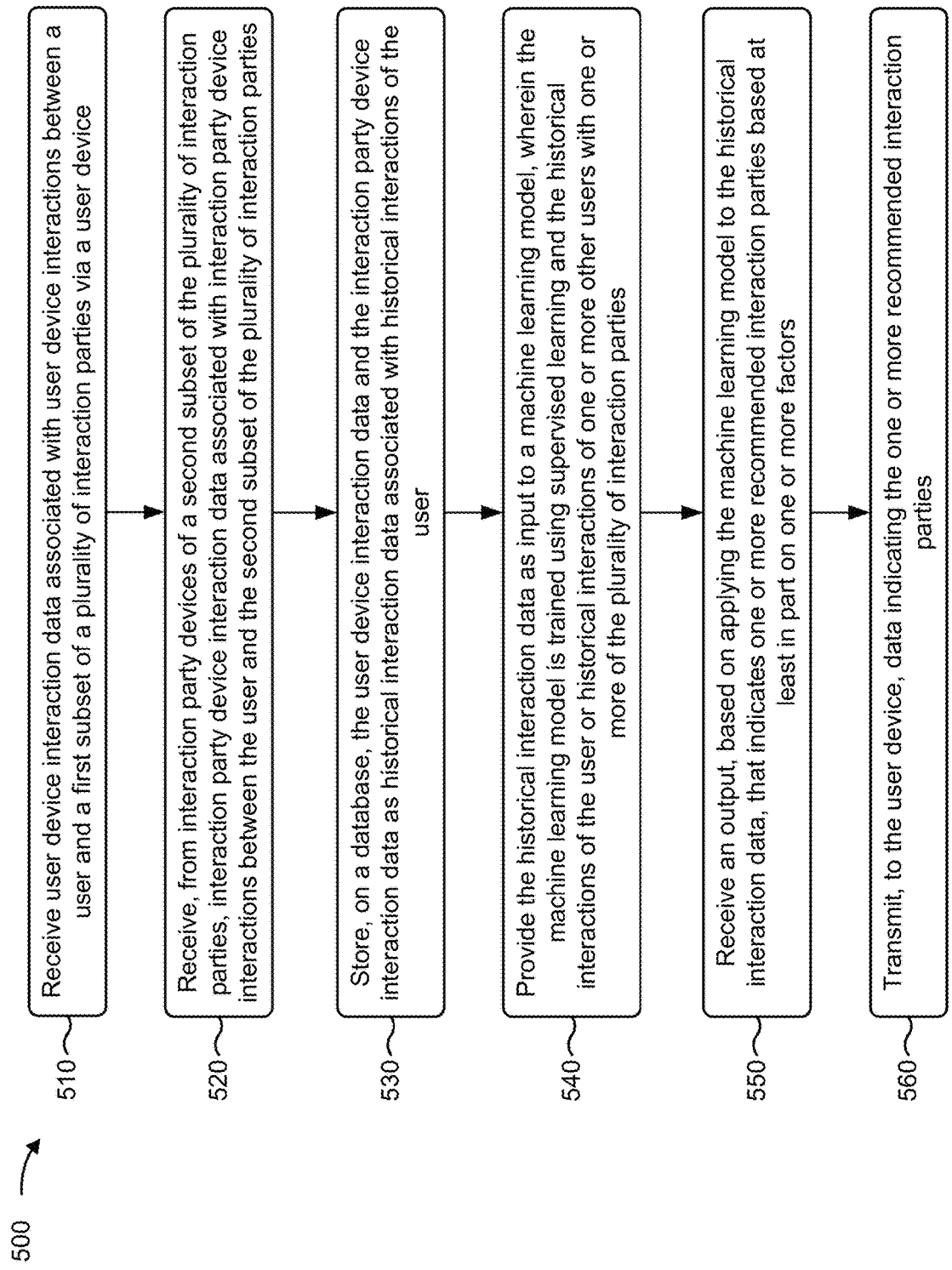

MACHINE LEARNING MODEL FOR RECOMMENDING INTERACTION PARTIES

RELATED APPLICATION

This application is a continuation of U.S. patent application Ser. No. 17/820,051, filed Aug. 16, 2022, which is incorporated herein by reference in its entirety.

BACKGROUND

Machine learning involves computers learning from data to perform tasks. Machine learning algorithms are used to train machine learning models based on sample data, known as "training data." Once trained, machine learning models may be used to make predictions, decisions, or classifications relating to new observations. Machine learning algorithms may be used to train machine learning models for a wide variety of applications, including computer vision, natural language processing, financial applications, medical diagnosis, and/or information retrieval, among many other examples

SUMMARY

Some implementations described herein relate to a system for recommending interaction parties. The system may include one or more memories and one or more processors communicatively coupled to the one or more memories. The one or more processors may be configured to receive user device interaction data associated with user device interactions between the user and a first subset of a plurality of interaction parties via a user device. The one or more processors may be configured to receive, from interaction party devices of a second subset of the plurality of interaction parties, interaction party device interaction data associated with interaction party device interactions between the user and the second subset of the plurality of interaction parties. The one or more processors may be configured to store, on a database, the user device interaction data and the interaction party device interaction data as historical interaction data associated with historical interactions of the user, wherein the historical interactions include the user device interactions and the interaction party device interactions. The one or more processors may be configured to provide the historical interaction data as input to a machine learning model, wherein the machine learning model is trained using supervised learning and the historical interactions of the user or historical interactions of one or more other users with one or more of the plurality of interaction parties. The one or more processors may be configured to receive an output, based on applying the machine learning model to the historical interaction data, that indicates one or more recommended interaction parties based at least in part on one or more factors, wherein the one or more recommended parties are local entities that are local to a geographic location associated with the user. The one or more processors may be configured to transmit, to the user device, data indicating the one or more recommended interaction parties.

Some implementations described herein relate to a method of recommending interaction parties. The method may include accessing, by a system that includes at least one processor and from a database, records of historical interactions of a user with a plurality of interaction parties, where the historical interactions include interactions performed via a user device of the user and interactions performed via interaction party devices of at least a subset of the plurality of interaction parties. The method may include determining, by the system, one or more recommended interaction parties based at least in part on one or more factors, where the one or more recommended interaction parties have one or more commonalities with one or more of the plurality of interaction parties from the historical interactions of the user, and where the one or more recommended parties are local entities that are local to a geographic location associated with the user. The method may include transmitting, by the system and to the user device, data indicating the one or more recommended interaction parties.

Some implementations described herein relate to a non-transitory computer-readable medium that stores a set of instructions for a device. The set of instructions, when executed by one or more processors of the device, may cause the device to access, from a database, records of historical interactions of a plurality of users with a plurality of interaction parties. The set of instructions, when executed by one or more processors of the device, may cause the device to determine one or more recommended interaction parties based at least in part on one or more factors. The set of instructions, when executed by one or more processors of the device, may cause the device to transmit, to a user device of the target user, data indicating the one or more recommended interaction parties.

BRIEF DESCRIPTION OF THE DRAWINGS

FIG. 5 is a flowchart of an example process relating to recommending interaction parties, in accordance with some embodiments of the present disclosure.

DETAILED DESCRIPTION

Figure 1A:
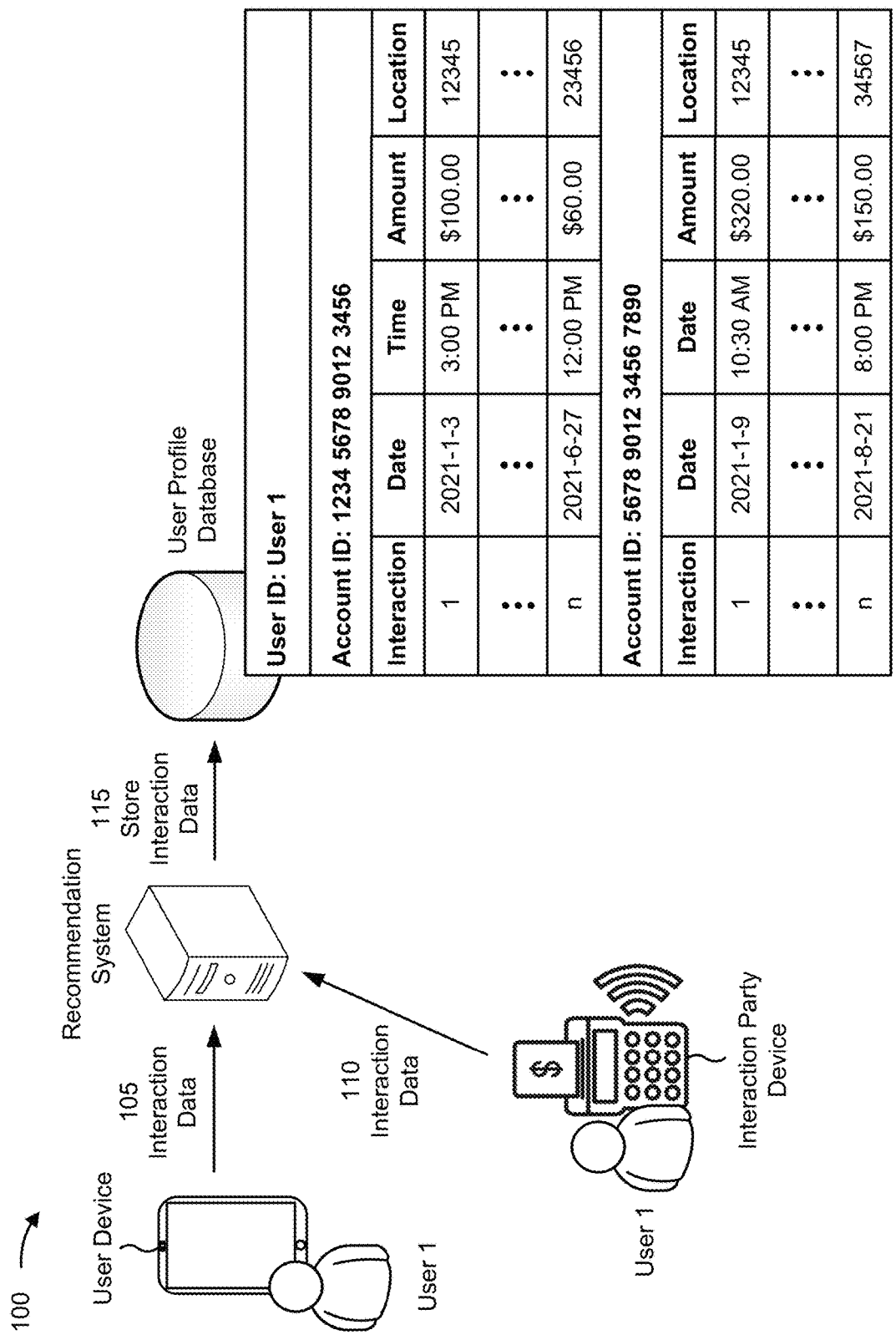
FIGS. 1A and 1B are diagrams of an example implementation relating to recommending interaction parties, in accordance with some embodiments of the present disclosure.

The following detailed description of example implementations refers to the accompanying drawings. The same reference numbers in different drawings may identify the same or similar elements.

A user may interact with different interaction parties (e.g., merchants, vendors, service providers, or restaurants) in different types of interactions (e.g., transactions), which may occur in person (e.g., at the brick-and-mortar venues and/or stores of the interaction parties) or remotely (e.g., in an online interaction). In some scenarios, the user may desire to have interaction parties recommended to the user (e.g., if the user is in an unfamiliar geographic location) that may resemble the user's regular interaction pattern and/or history.

However, to find an interaction party on the user's own, the user may have to invest substantial time to research different interaction parties, for example, by reading through various reviews of multiple interaction parties. Such time may require excess computing resources, both of the user device and of a system from which the user is performing the research. In addition to the amount of time required, the user may be limited in the information available to the user to be able to find another interaction party that closely resembles the particular interaction party to the user's satisfaction. For example, the user may not have customer/user information and/or sales information of the interaction parties. Additionally, the user may not know, with a high level of certainty, that the reviews that the user is reading have similar preferences as the user. Accordingly, it is desirable to have a system that accurately and efficiently recommends interaction parties to the user to conserve time and computing resources.

Some implementations described herein enable a recommendation system to provide recommendations of interaction parties to a user based on the user's interaction history and/or the interaction history of other users. The recommendation system may determine which interaction parties to recommend based on one or more factors (e.g., time of day, day of week, and/or time of year), as well as a geographic location associated with the user. The recommended interaction parties may have one or more commonalities with one or more interaction parties in the user's interaction history and/or the interaction history of the other users. In some implementations, the recommended interaction parties may be local entities that are local to the geographic location associated with the user (e.g., the recommended interaction parties are small businesses that may only be found in or around the particular geographic location). As such, the user may be able to experience and participate in an interaction with an interaction party to which the user otherwise may not have been able, while still maintaining a close resemblance to familiar interactions and/or interaction parties.

By relying on the user's interaction history and the interaction history of multiple other users, to which the recommendation system has access (e.g., as part of a financial institution with which the users have accounts), the recommendation system has actual knowledge that the user (s) have interacted with specific interaction parties (e.g., stores, merchants, and/or service providers). As a result, the recommendation system is able to efficiently provide, to the user, recommendations of interaction parties similar to the interaction parties from the user's interaction history with a high level of certainty and accuracy that the user will have a positive experience with the similar interaction parties. As a result, computer resources needed to perform multiple searches (e.g., by the user) of similar interaction parties may be conserved.

Figure 1B:
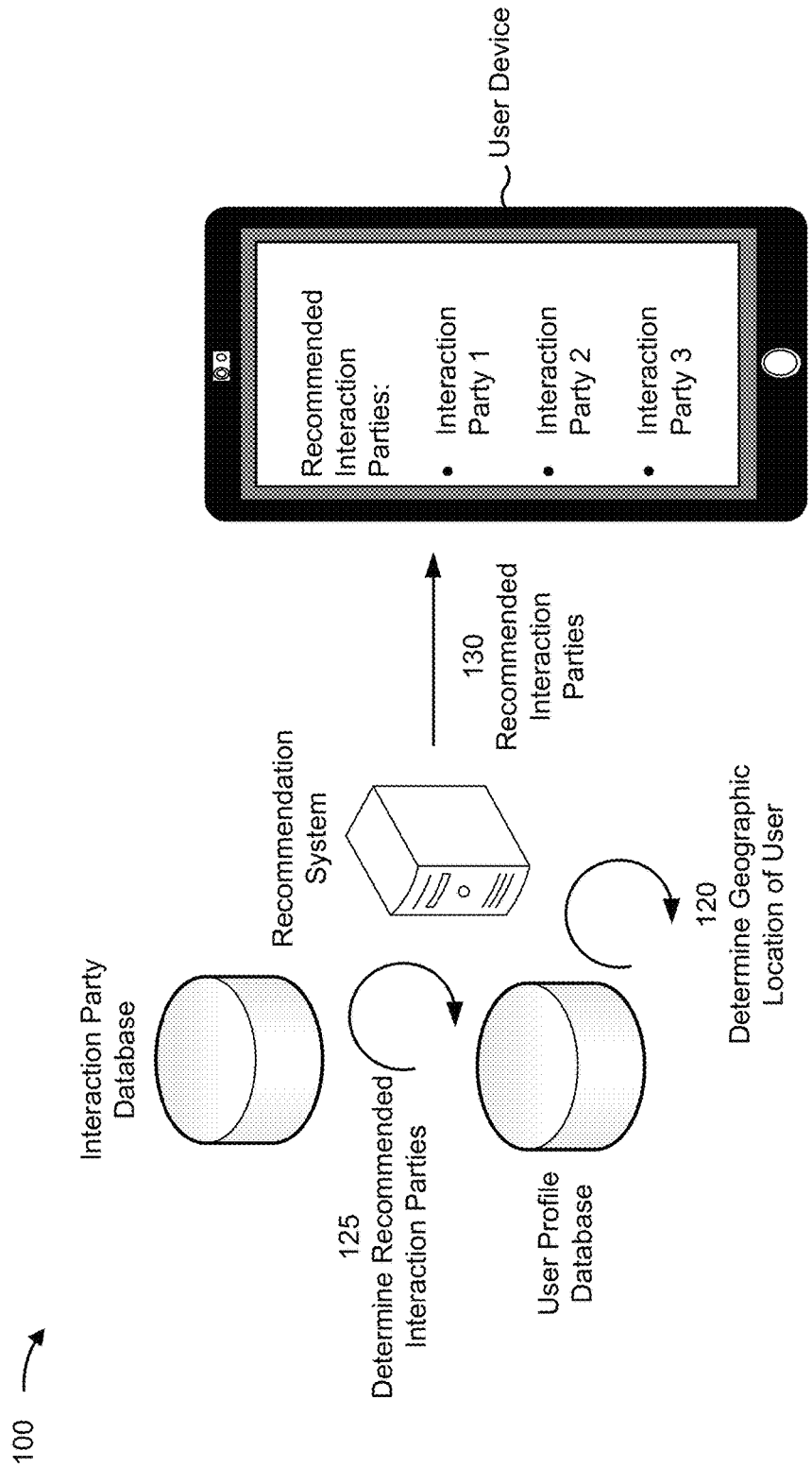

FIGS. 1A and 1B are diagrams of an example 100 associated with recommending interaction parties. As shown in FIGS. 1A and 1B, example 100 includes a recommendation system, a user device, an interaction party device, a user profile database, and an interaction party database. These devices are described in more detail in connection with FIGS. 3 and 4.

As shown in FIG. 1A, a user of a user account, for whom interaction parties are being recommended (also referred to as the target user), may engage in multiple interactions (e.g., transactions) with different interaction parties (e.g., merchants, vendors, service providers, or restaurants). The user may remotely perform, via the user device of the user, interactions (also referred to as user device interactions) with a first subset of the interaction parties, such as in an online interaction. As shown by reference number 105, the recommendation system may receive interaction data (also referred to as user device interaction data) associated with the user device interactions. The user device data may be received from the user device and/or any intermediate devices (not shown) associated with the user device interactions (e.g., a payment server). The user also may perform, via interaction party devices (e.g., point-of-sale (POS) terminals or kiosks) interactions (also referred to as interaction party device interactions) in person at venues or stores of a second subset of the interaction parties. As shown by reference number 110, the recommendation system may receive, from the interaction party devices over the network, interaction data (also referred to as interaction party device interaction data) associated with the interaction party device interactions. At least some of the first subset of the interaction parties and the second subset of the interaction parties may be the same. Alternatively, the first subset of the interaction parties and the second subset of the interaction parties may be wholly different.

As shown by reference number 115, the recommendation system may store the interaction data (e.g., in a user profile database) under a user account associated with the user. The user and/or the user account may be associated with a unique user identifier (e.g., a username) and/or one or more unique account identifiers (e.g., an account ID number, a primary account number (PAN), or a virtual card number). The interaction data may include the user identifier and/or the account identifier(s) used in the particular interaction. The interaction data also may indicate information associated with the interactions, such as interaction amounts, interaction dates, timestamps, and/or geographic locations (e.g., zip code and/or geographic coordinates). The recommendation system may store the interaction data in the user profile database as historical interaction data associated with historical interactions of the user (e.g., the user device interactions and/or the interaction party device interactions). As shown in FIG. 1A, the information associated with the interactions may be separated in the user profile database based on the account identifiers associated with the historical interactions. Alternatively, the historical interactions may be grouped together, irrespective of the account identifiers, under the user identifier.

As shown in FIG. 1B and by reference number 120, the recommendation system may determine a geographic location of the user. The geographic location may be a current geographic location or a future or expected geographic location. The current geographic location may be determined based on user information associated with the user identifier and/or user account stored on the user profile database (e.g., the user's address). Alternatively, the current geographic location may be determined based on a current location of the user device (e.g., via location services enabled on the user device and transmitted to the recommendation system).

The expected geographic location may be determined from user information and/or historical interaction data of the user stored in the user profile database. For example, the user profile database may have information stored under the user account that corresponds to the user's future travel dates and geographic location (e.g., city, state, and/or zip code). As another example, the historical interaction data may include information corresponding to one or more historical interactions with one or more interaction parties associated with travel (e.g., a hotel, an airline, and/or a travel agency). The one or more historical interactions may have occurred, as indicated by the historical interaction data, within a date threshold (e.g., 3 months, 6 months, or a year) from a current date. The recommendation system may be able to obtain location information of a particular interaction party that would indicate the expected geographic location (e.g., the address of the hotel) from the historical interaction data and/or interaction party data (e.g., from an interaction party database). Additionally, or alternatively, the recommendation system may be able to extract location information from the historical interaction data associated with a particular historical interaction (e.g., flight data from an airplane ticket purchased via the user account).

As shown by reference number 125, the recommendation system may determine one or more interaction parties (also referred to as recommended interaction parties) to recommend to the user. The determination may be based on the geographic location associated with the user (e.g., current geographic location or future geographic location). For example, the recommended interaction parties may be local entities that are local to the geographic location associated with the user. An interaction party may be a local entity if the interaction party has at least one venue or store within a same geographic area as the geographic location associated with the user (e.g., within a distance threshold (e.g., 5 miles, 10 miles, or 50 miles) of the geographic location and/or in a same zip code). Additionally, or alternatively, the interaction party may be a local entity if the number of venues and/or stores of the interaction party does not exceed a threshold number (e.g., 3, 4, or 5). Additionally, or alternatively, the interaction party may be a local entity if a total interaction amount (e.g., revenue) over a particular timeframe (e.g., a month or a year) is less than a threshold amount (e.g., $100,000). The information associated with the interaction parties to determine a local entity status (e.g., geographic location of venues/stores, number of venues stores, and/or total interaction amounts) may be obtained from the interaction party database.

Additionally, the recommendation system may determine the recommended interaction parties based on one or more factors and/or one or more conditions. For example, one factor may include a current time of day, and an associated condition may be that a timestamp associated with a particular historical interaction of the user is within a time threshold (e.g., 30 minutes, 1 hour, or 2 hours) of the current time of day. As an example, if a current time of day is 12:00 PM, then for a time threshold of 1 hour, then the recommendation system may identify interaction parties with which other users, such as users similar to the user (e.g., users in a same user cluster, as described in more detail below), have historical interactions that occurred between 11:00 AM and 1:00 PM. Additionally, or alternatively, the recommendation system may identify interaction parties similar to interaction parties with which the user has historical interactions (e.g., interaction parties in a same interaction party cluster) that occurred between 11:00 AM and 1:00 PM.

As another example, another factor may include a current day of the week (e.g., whether the current day is a particular day, a weekday, or a weekend), and an associated condition may be that a particular historical interaction occurred on a same day as the current day of the week. For example, if the current day is a weekend, then the recommendation system may identify interaction parties with which other users (e.g., users in a same user cluster) have historical interactions that also occurred on a weekend. Additionally, or alternatively, the recommendation system may identify similar interaction parties (e.g., interaction parties in a same interaction party cluster) to interaction parties with which the user has historical interactions that also occurred on a weekend.

As another example, another factor may be a current time of the year or current season (e.g., fall, winter, spring, or summer), and an associated condition may be that a particular historical interaction occurred during a same season. For example, if the current season is spring, then the recommendation system may identify interaction parties with which other users (e.g., users in a same user cluster) have historical interactions that also occurred in the spring. Additionally, or alternatively, the recommendation system may identify similar interaction parties (e.g., interaction parties in a same interaction party cluster) to interaction parties with which the user has historical interactions that also occurred in the spring.

Additionally, or alternatively, the recommendation system may determine recommended interaction parties based on information associated with the user (e.g., credit history, socioeconomic status). The recommendation system may obtain the information from the user account stored in the user profile database. Additionally, or alternatively, the recommendation system may obtain the information from one or more third-party databases (e.g., a credit history database, a social security database, and/or other federal databases). For example, if the user is classified with a particular socioeconomic status, then the recommendation system may identify and recommend interaction parties that have interactions that match the particular socioeconomic status. As another example, if the user has a high credit score (e.g., above 700), then the recommendation system may identify and recommend interaction parties that have interactions associated with high interaction amounts (e.g., above $1,000) and/or that accept credit (e.g., credit cards) as a form of completing the interaction. If the user has a low credit score (e.g., below 500), then the recommendation system may identify and recommend interaction parties with low interaction amounts (e.g., less than $50) and/or that only accept case as a form of completing the interaction.

Additionally, or alternatively, the recommendation system may determine recommended interaction parties based on one or more commonalities between the recommended interaction parties and interaction parties in historical interactions of the user and/or interaction parties in historical interactions of other users (collectively referred to as historical interaction parties). The historical interaction parties may be determined based on one or more of the factors described above.

As an example of a commonality, the historical interactions associated with the recommended interaction parties and with the historical interaction parties may be associated with and/or categorized by interaction types (e.g., as indicated by the historical interaction data in the user profile database). For example, a historical interaction between a particular user (e.g., the target user or another user) and a hotel or an airline may have a travel interaction type. As another example, a historical interaction between a particular user and a restaurant may have a dining interaction type. Additionally, the interaction type may be refined based on additional information indicated by and/or derived from the historical interaction data (e.g., time of day, day of the week, time of year, and/or average interaction amounts). For example, a historical interaction with a restaurant that occurs in during morning ours (e.g., before 11:00 AM) may have an additional or a more specific breakfast interaction type. A commonality may exist if at least one interaction type is common between the recommended interaction parties and one or more of the historical interaction parties.

As another example of a commonality, the recommended interaction parties and the historical interaction parties may be associated with one or more interaction party types (e.g., as stored in the interaction party database). Examples of interaction party types may include restaurants, bars, movie theaters, hotels, airlines, travel agencies, grocery stores, hardware stores, toy stores, clothing stores, etc. The recommended interaction parties may have a commonality with one or more of the historical interaction parties if there is at least one common interaction party type.

As another example of a commonality, the recommendation system may be able to determine particular items associated with the historical interactions (also referred to as interaction items) and/or types of interaction items (also referred to as interaction item types). The interaction items and/or interaction item types may be indicated in the historical interaction data and accessed from the user profile database. For example, the historical interaction data for a particular interaction with a restaurant may indicate the specific items ordered. Additionally, or alternatively, the recommendation system may be able to determine the interaction items and/or interaction item types from other information, such as an interaction party identifier (e.g., name) of the interaction parties and/or the interaction party types associated with the interaction parties. For example, if a historical interaction is at a grocery store, then the interaction item type may be groceries. As another example, if the interaction party type is a vegan restaurant, then the interaction item type may be vegan food. A commonality may exist if at least one interaction item type is common between the recommended interaction parties and one or more of the historical interaction parties.

As another example of a commonality, a commonality may exist if average interaction amounts associated with the recommended interaction parties and one or more of the historical interaction parties are within a threshold of each other. The threshold may be a percentage threshold (e.g., the average interaction amounts are within a percentage threshold (e.g., 1%, 5%, or 10%) of each other). Alternatively, the threshold may be an amount threshold (e.g., the average interaction amounts are within an amount threshold (e.g., $5, $10, $25, or $50) of each other). The historical interaction data may indicate interaction amounts of the historical interactions and from which the recommendation system may determine the average interaction amounts. Additionally, or alternatively, the average interaction amounts may be obtained from the interaction party database, in which data indicating the average interaction amounts is stored and associated with interaction party identifiers corresponding to the interaction parties (e.g., the recommended interaction parties and/or the historical interaction parties).

In some implementations, the recommendation system may determine one or more preferences of the user based at least in part on the historical interactions of the user and/or user information associated with the user account in the user profile database. For example, the user information may include the user's financial status and/or balances associated with the user account. As an example, if the balance is above an amount threshold (e.g., $100,000), then the recommendation system may determine that the user has a preference for high end (e.g., luxury) items and dining. As another example, if the historical interactions only include interactions involving electrical charging for vehicles and no gas-related historical interactions, then the recommendation system may determine that the user has an electric vehicle, and therefore, may have a preference for environmentally-conscious interactions. As another example, if the historical interactions only involve vegetarian items, then the recommendation system may determine that the user is a vegetarian.

In some implementations, the recommendation system may use a machine learning model to determine the recommended interaction parties (e.g., whether a particular interaction party should be recommended). The machine learning model may be trained using supervised learning and the historical interactions of the user or the historical interactions of one or more other users with various interaction parties to determine whether or not to recommend the particular interaction party, as described in more detail below in connection with FIG. 2.

As shown by reference number 130, the recommendation system may transmit, to the user device of the target user, recommended interaction party data indicating one or more of the recommended interaction parties to be presented on a display of the user device. In some implementations, for each recommended interaction party, the recommended interaction party data may include an option for the user to provide feedback regarding the particular recommended interaction party. For example, the feedback may be whether the user is interested or not. Alternatively, the feedback may be able to be provided after the user has performed an interaction with the particular recommended interaction party, and may indicate whether or not the user had a positive experience with the particular recommended interaction party. In scenarios in which a machine learning model was used to determine the recommended interaction parties, the feedback may be used to re-train the machine learning model, as described in more detail below in connection with FIG. 2.

As described above, the recommendation system is able to determine and recommend to the user one or more similar interaction parties that are similar to a selected interaction party identified by the user by analyzing metrics associated with one or more aspects related to the interaction parties. By relying on such metrics, the recommendation system is able to provide recommendations of similar interaction parties to the user with a high level of certainty that the user will have a positive experience with the similar interaction parties. As a result, computer resources needed to perform multiple searches (e.g., by the user) of similar interaction parties may be conserved.

As indicated above, FIGS. 1A-1B are provided as an example. Other examples may differ from what is described with regard to FIGS. 1A-1B.

Figure 2:
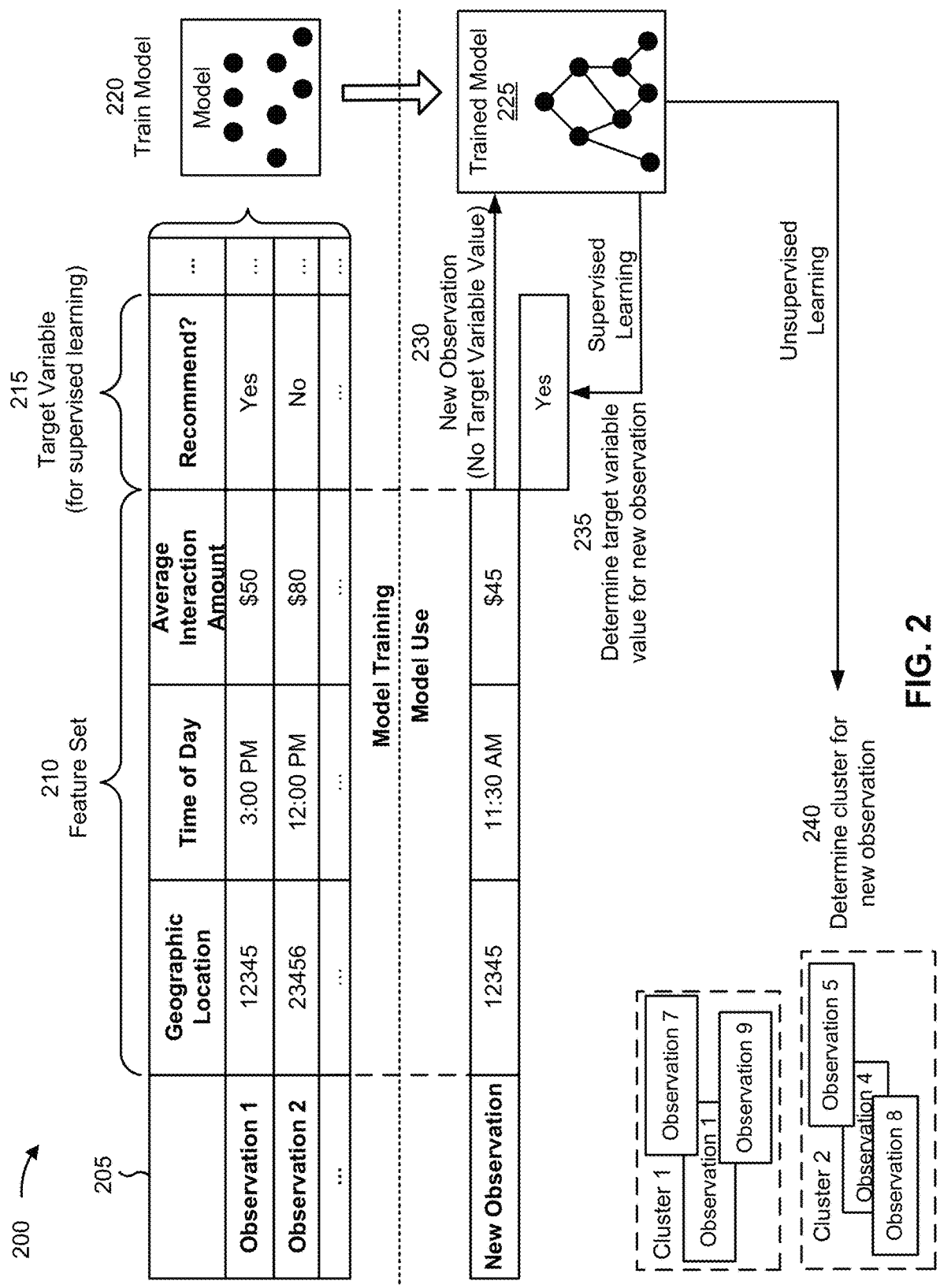
FIG. 2 is a diagram illustrating an example of training and using a machine learning model in connection with recommending interaction parties, in accordance with some embodiments of the present disclosure.

FIG. 2 is a diagram illustrating an example 200 of training and using a machine learning model in connection with recommending interaction parties. The machine learning model training and usage described herein may be performed using a machine learning system. The machine learning system may include or may be included in a computing device, a server, a cloud computing environment, or the like, such as the recommendation system described in more detail elsewhere herein.

As shown by reference number 205, a machine learning model may be trained using a set of observations. The set of observations may be obtained from training data (e.g., historical data), such as data gathered during one or more processes described herein. In some implementations, the machine learning system may receive the set of observations (e.g., as input) from the user device, the interaction party device, the user profile database, and/or the interaction party database, as described elsewhere herein.

As shown by reference number 210, the set of observations includes a feature set. The feature set may include a set of variables, and a variable may be referred to as a feature. A specific observation may include a set of variable values (or feature values) corresponding to the set of variables. In some implementations, the machine learning system may determine variables for a set of observations and/or variable values for a specific observation based on input received from the user device, the interaction party device, the user profile database, and/or the interaction party database. For example, the machine learning system may identify a feature set (e.g., one or more features and/or feature values) by extracting the feature set from structured data, by performing natural language processing to extract the feature set from unstructured data, and/or by receiving input from an operator.

As an example, a feature set for a set of observations may include a first feature of location, a second feature of time of day, a third feature of average interaction amount, and so on. As shown, for a first observation, the first feature may have a value of "12345," the second feature may have a value of "3:00 PM," the third feature may have a value of "$50," and so on. These features and feature values are provided as examples, and may differ in other examples. For example, the feature set may include one or more of the following features: date of the interaction, interaction type(s) associated with the interaction, interaction item type(s) associated with the interaction, and/or interaction party type(s) of the interaction party associated with the interaction.

As shown by reference number 215, the set of observations may be associated with a target variable. The target variable may represent a variable having a numeric value, may represent a variable having a numeric value that falls within a range of values or has some discrete possible values, may represent a variable that is selectable from one of multiple options (e.g., one of multiples classes, classifications, or labels) and/or may represent a variable having a Boolean value. A target variable may be associated with a target variable value, and a target variable value may be specific to an observation. In example 200, the target variable is whether or not to recommend the particular interaction party, which has a value of "Yes" for the first observation.

The target variable may represent a value that a machine learning model is being trained to predict, and the feature set may represent the variables that are input to a trained machine learning model to predict a value for the target variable. The set of observations may include target variable values so that the machine learning model can be trained to recognize patterns in the feature set that lead to a target variable value. A machine learning model that is trained to predict a target variable value may be referred to as a supervised learning model.

In some implementations, the machine learning model may be trained on a set of observations that do not include a target variable. This may be referred to as an unsupervised learning model. In this case, the machine learning model may learn patterns from the set of observations without labeling or supervision, and may provide output that indicates such patterns, such as by using clustering and/or association to identify related groups of items within the set of observations.

As shown by reference number 220, the machine learning system may train a machine learning model using the set of observations and using one or more machine learning algorithms, such as a regression algorithm, a decision tree algorithm, a neural network algorithm, a k-nearest neighbor algorithm, a support vector machine algorithm, or the like. After training, the machine learning system may store the machine learning model as a trained machine learning model 225 to be used to analyze new observations.

As an example, the machine learning system may obtain training data for the set of observations based on historical interactions of one or more users with multiple interaction parties. Data may be obtained from historical interaction data associated with the interactions (e.g., from the user profile database) and/or from interaction party data associated with the interaction parties (e.g., from the interaction party database).

As shown by reference number 230, the machine learning system may apply the trained machine learning model 225 to a new observation, such as by receiving a new observation and inputting the new observation to the trained machine learning model 225. As shown, the new observation may include a first feature of a geographic location having a value of "12345," a second feature of time of day having a value of "11:30 AM," a third feature of average interaction amount having a value of "45," and so on, as an example. The machine learning system may apply the trained machine learning model 225 to the new observation to generate an output (e.g., a result). The type of output may depend on the type of machine learning model and/or the type of machine learning task being performed. For example, the output may include a predicted value of a target variable, such as when supervised learning is employed. Additionally, or alternatively, the output may include information that identifies a cluster to which the new observation belongs and/or information that indicates a degree of similarity between the new observation and one or more other observations, such as when unsupervised learning is employed.

As an example, the trained machine learning model 225 may predict a value of "Yes" for the target variable of whether or not to recommend the particular interaction party for the new observation, as shown by reference number 235. Based on this prediction, the machine learning system may provide a first recommendation, may provide output for determination of a first recommendation, may perform a first automated action, and/or may cause a first automated action to be performed (e.g., by instructing another device to perform the automated action), among other examples. The first recommendation may include, for example, the recommended interaction party. The first automated action may include, for example, transmitting data indicating the particular recommended interaction party.

In some implementations, the recommendation system and/or the machine learning system may train and/or apply an unsupervised machine learning model, such as to cluster users. To cluster users, the observations may include demographic information and/or interaction histories of the users, among other examples. In these cases, the output of the machine learning model may include information that identifies a cluster to which a new observation belongs and/or information that indicates a degree of similarity between the new observation and one or more other observations. As an example of an unsupervised learning model, the trained machine learning model 225 may classify (e.g., cluster) the new observation in a cluster, as shown by reference number 240. The observations within a cluster may have a threshold degree of similarity. As an example, the users in a cluster of users may have the same or similar demographic information (e.g., sex, age, age range, and/or socioeconomic status) or may have the same or similar pattern of interactions (e.g., interactions at similar times and/or with similar interaction parties based on the historical interaction data of the users). As another example, the interaction parties in a cluster of interaction parties may have the same or similar interaction party types and/or similar average interaction amounts (e.g., within a threshold range).

In some implementations, the recommendation and/or the automated action associated with the new observation may be based on a target variable value having a particular label (e.g., classification or categorization), may be based on whether a target variable value satisfies one or more threshold (e.g., whether the target variable value is greater than a threshold, is less than a threshold, is equal to a threshold, falls within a range of threshold values, or the like), and/or may be based on a cluster in which the new observation is classified.

In some implementations, the trained machine learning model 225 may be re-trained using feedback information. For example, feedback may be provided to the machine learning model. The feedback may be associated with actions performed based on the recommendations provided by the trained machine learning model 225 and/or automated actions performed, or caused, by the trained machine learning model 225. In other words, the recommendations and/or actions output by the trained machine learning model 225 may be used as inputs to re-train the machine learning model (e.g., a feedback loop may be used to train and/or update the machine learning model). For example, the feedback information may include an indication of whether or not the target user is interested in the particular recommended interaction party (e.g., before participating in an interaction with the particular recommended interaction party) or if the target user had a positive experience with the particular recommended interaction party (e.g., after participating in the interaction with the particular recommended interaction party).

In this way, the machine learning system may apply a rigorous and automated process to recommend interaction parties to a target user. The machine learning system enables recognition and/or identification of tens, hundreds, thousands, or millions of features and/or feature values for tens, hundreds, thousands, or millions of observations, thereby increasing accuracy and consistency and reducing delay associated with recommending interaction parties relative to requiring computing resources to be allocated for tens, hundreds, or thousands of operators to manually recommend interaction parties using the features or feature values.

As indicated above, FIG. 2 is provided as an example. Other examples may differ from what is described in connection with FIG. 2.

Figure 3:
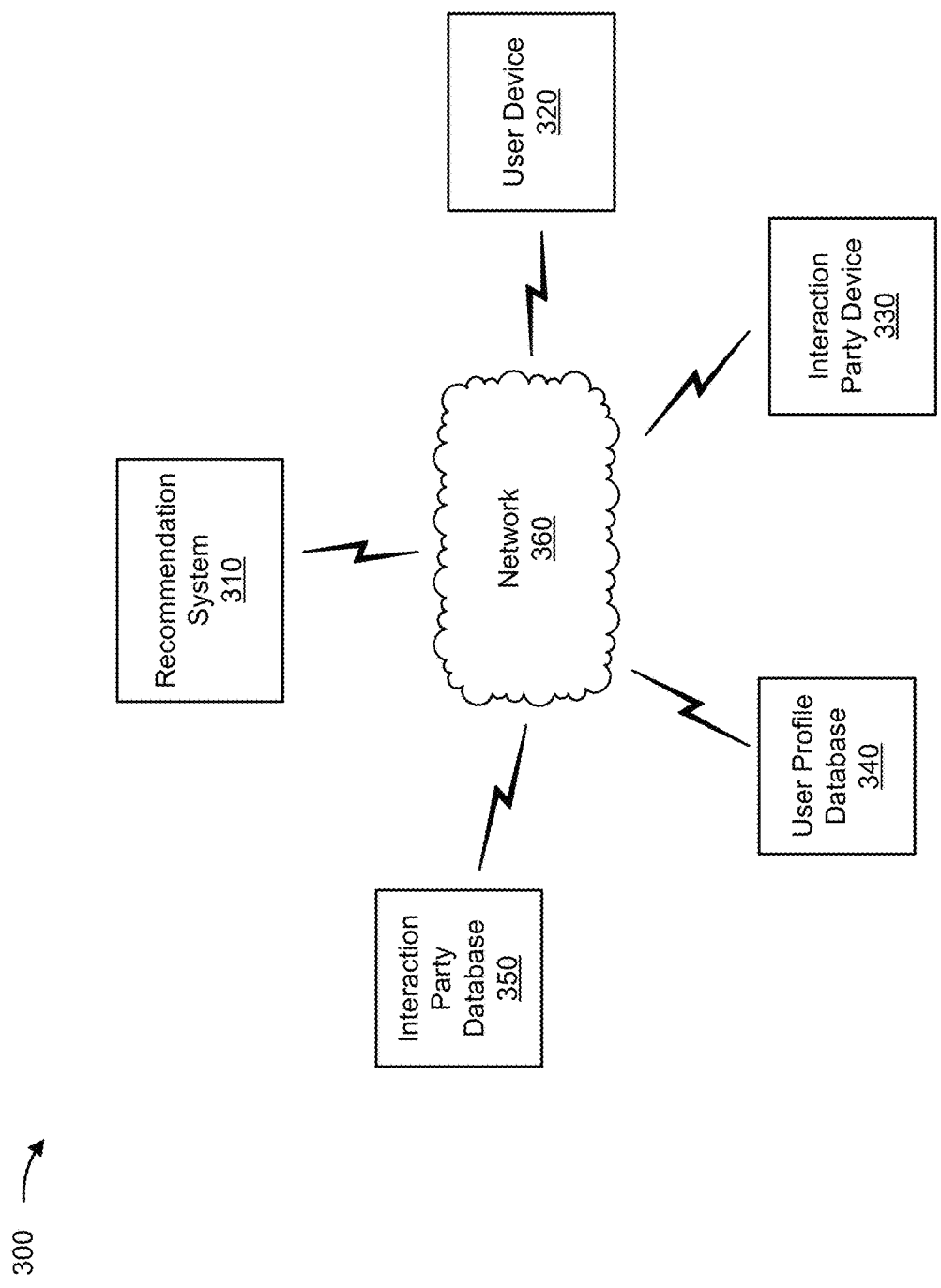
FIG. 3 is a diagram of an example environment in which systems and/or methods described herein may be implemented, in accordance with some embodiments of the present disclosure.

FIG. 3 is a diagram of an example environment 300 in which systems and/or methods described herein may be implemented. As shown in FIG. 3, environment 300 may include a recommendation system 310, a user device 320, an interaction party device 330, a user profile database 340, an interaction party database 350, and a network 360. Devices of environment 300 may interconnect via wired connections, wireless connections, or a combination of wired and wireless connections.

The recommendation system 310 includes one or more devices capable of receiving, generating, storing, processing, providing, and/or routing information associated with recommending interaction parties, as described elsewhere herein. The recommendation system 310 may include a communication device and/or a computing device. For example, the recommendation system 310 may include a server, such as an application server, a client server, a web server, a database server, a host server, a proxy server, a virtual server (e.g., executing on computing hardware), or a server in a cloud computing system. In some implementations, the recommendation system 310 includes computing hardware used in a cloud computing environment.

The user device 320 includes one or more devices capable of receiving, generating, storing, processing, and/or providing information associated with recommending interaction parties, as described elsewhere herein. The user device 320 may include a communication device and/or a computing device. For example, the user device 320 may include a wireless communication device, a mobile phone, a user equipment, a laptop computer, a tablet computer, a desktop computer, a gaming console, a set-top box, a wearable communication device (e.g., a smart wristwatch, a pair of smart eyeglasses, a head mounted display, or a virtual reality headset), or a similar type of device.

The interaction party device 330 includes one or more devices capable of receiving, generating, storing, processing, and/or providing information associated with recommending interaction parties, as described elsewhere herein. The interaction party device 330 may include a communication device and/or a computing device. For example, the interaction party device 330 may include a wireless communication device, a mobile phone, a user equipment, a laptop computer, a tablet computer, a desktop computer, a wearable communication device (e.g., a smart wristwatch, a pair of smart eyeglasses, a head mounted display, or a virtual reality headset), or a similar type of device.

Additionally, or alternatively, the interaction party device 330 may include one or more devices capable of facilitating an interaction (e.g., an exchange or transaction) with a user (e.g., an account holder). For example, the interaction party device 330 may include a kiosk (e.g., a financial service kiosk), a secure access terminal (e.g., a terminal equipped with an encrypted connection to a server and/or database), a PoS terminal, and/or a payment terminal (e.g., a credit card terminal, a contactless payment terminal, a mobile credit card reader, or a chip reader). The interaction party device 330 may include one or more input components and/or one or more output components to facilitate obtaining data (e.g., account information) from a physical medium (e.g., a transaction card, a mobile device executing a banking application, or the like) and/or to facilitate interaction with the user. Example input components of the interaction party device 330 include a number keypad, a touchscreen, a magnetic stripe reader, a chip reader, and/or a radio frequency (RF) signal reader (e.g., a near field communication (NFC) reader). Example output devices of the interaction party device 330 include a display and/or a speaker.

The user profile database 340 includes one or more devices capable of receiving, generating, storing, processing, and/or providing information associated with recommending interaction parties, as described elsewhere herein. The user profile database 340 may include a communication device and/or a computing device. For example, the user profile database 340 may include a data structure, a database, a data source, a server, a database server, an application server, a client server, a web server, a host server, a proxy server, a virtual server (e.g., executing on computing hardware), a server in a cloud computing system, a device that includes computing hardware used in a cloud computing environment, or a similar type of device. As an example, the user profile database 340 may store interaction data indicating information associated with historical interactions of a plurality of users (e.g., date of the interactions, times of the interactions, amounts associated with the interactions, locations of the interaction, interaction types associated with the interactions, and/or item types of items associated with the interactions), as described elsewhere herein.

The interaction party database 350 includes one or more devices capable of receiving, generating, storing, processing, and/or providing information associated with recommending interaction parties, as described elsewhere herein. The interaction party database 350 may include a communication device and/or a computing device. For example, the interaction party database 350 may include a data structure, a database, a data source, a server, a database server, an application server, a client server, a web server, a host server, a proxy server, a virtual server (e.g., executing on computing hardware), a server in a cloud computing system, a device that includes computing hardware used in a cloud computing environment, or a similar type of device. As an example, the interaction party database 350 may store interaction party data indicating information associated with a plurality of interaction parties (e.g., geographic locations associated with the interaction parties, interaction party types of the interaction parties, and/or interaction amounts associated with interactions with the interaction parties), as described elsewhere herein.

The network 360 includes one or more wired and/or wireless networks. For example, the network 360 may include a wireless wide area network (e.g., a cellular network or a public land mobile network), a local area network (e.g., a wired local area network or a wireless local area network (WLAN), such as a Wi-Fi network), a personal area network (e.g., a Bluetooth network), a near-field communication network, a telephone network, a private network, the Internet, and/or a combination of these or other types of networks. The network 360 enables communication among the devices of environment 300.

The number and arrangement of devices and networks shown in FIG. 3 are provided as an example. In practice, there may be additional devices and/or networks, fewer devices and/or networks, different devices and/or networks, or differently arranged devices and/or networks than those shown in FIG. 3. Furthermore, two or more devices shown in FIG. 3 may be implemented within a single device, or a single device shown in FIG. 3 may be implemented as multiple, distributed devices. Additionally, or alternatively, a set of devices (e.g., one or more devices) of environment 300 may perform one or more functions described as being performed by another set of devices of environment 300.

Figure 4:
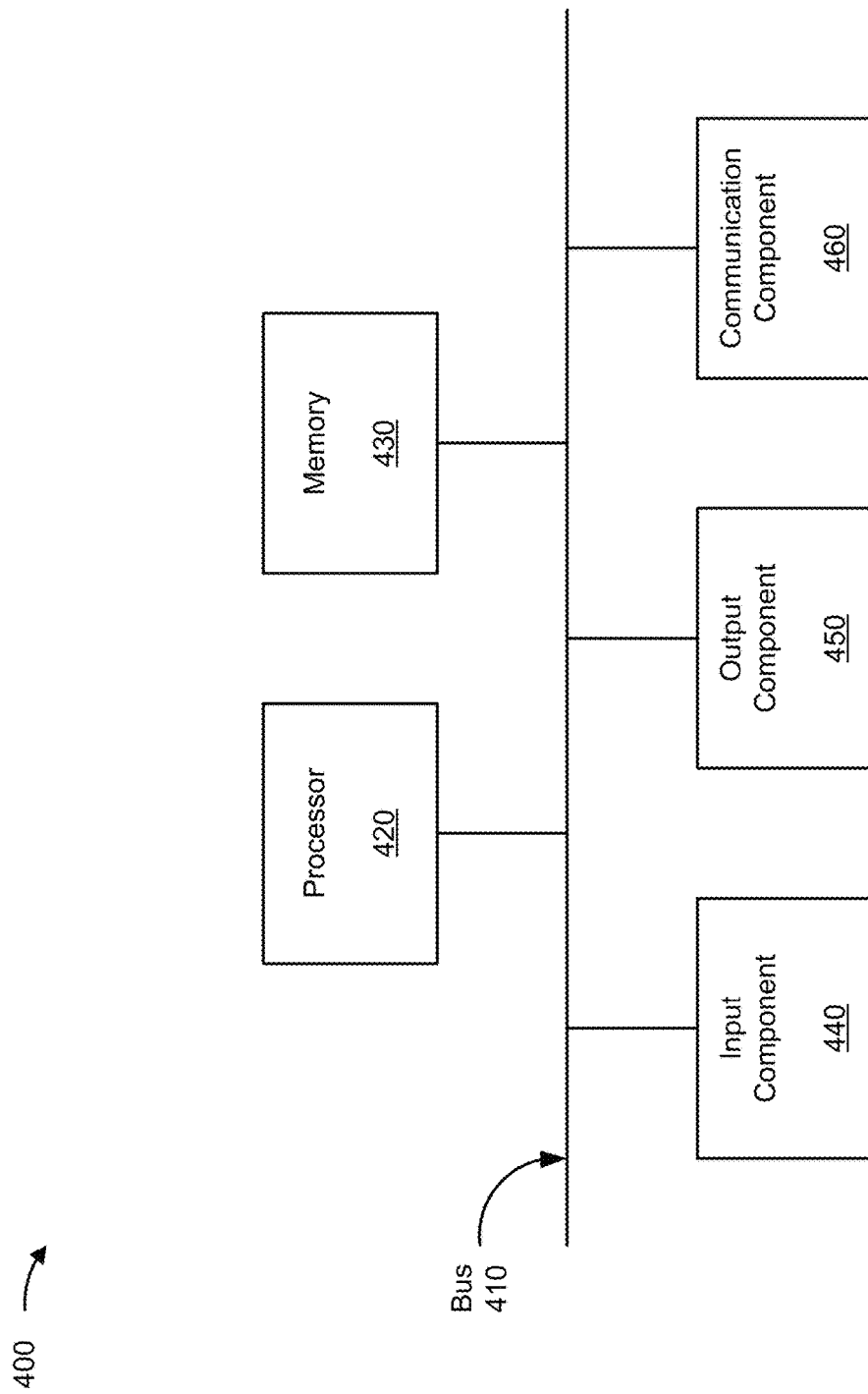
FIG. 4 is a diagram of example components of one or more devices of FIG. 3, in accordance with some embodiments of the present disclosure.

FIG. 4 is a diagram of example components of a device 400, which may correspond to the recommendation system, the user device, the interaction party device, the user profile database, and/or the interaction party database. In some implementations, the recommendation system, the user device, the interaction party device, the user profile database, and/or the interaction party database include one or more devices 400 and/or one or more components of device 400. As shown in FIG. 4, device 400 may include a bus 410, a processor 420, a memory 430, an input component 440, an output component 450, and a communication component 460.

Bus 410 includes one or more components that enable wired and/or wireless communication among the components of device 400. Bus 410 may couple together two or more components of FIG. 4, such as via operative coupling, communicative coupling, electronic coupling, and/or electric coupling. Processor 420 includes a central processing unit, a graphics processing unit, a microprocessor, a controller, a microcontroller, a digital signal processor, a field-programmable gate array, an application-specific integrated circuit, and/or another type of processing component. Processor 420 is implemented in hardware, firmware, or a combination of hardware and software. In some implementations, processor 420 includes one or more processors capable of being programmed to perform one or more operations or processes described elsewhere herein.

Memory 430 includes volatile and/or nonvolatile memory. For example, memory 430 may include random access memory (RAM), read only memory (ROM), a hard disk drive, and/or another type of memory (e.g., a flash memory, a magnetic memory, and/or an optical memory). Memory 430 may include internal memory (e.g., RAM, ROM, or a hard disk drive) and/or removable memory (e.g., removable via a universal serial bus connection). Memory 430 may be a non-transitory computer-readable medium. Memory 430 stores information, instructions, and/or software (e.g., one or more software applications) related to the operation of device 400. In some implementations, memory 430 includes one or more memories that are coupled to one or more processors (e.g., processor 420), such as via bus 410.

Input component 440 enables device 400 to receive input, such as user input and/or sensed input. For example, input component 440 may include a touch screen, a keyboard, a keypad, a mouse, a button, a microphone, a switch, a sensor, a global positioning system sensor, an accelerometer, a gyroscope, and/or an actuator. Output component 450 enables device 400 to provide output, such as via a display, a speaker, and/or a light-emitting diode. Communication component 460 enables device 400 to communicate with other devices via a wired connection and/or a wireless connection. For example, communication component 460 may include a receiver, a transmitter, a transceiver, a modem, a network interface card, and/or an antenna.

Device 400 may perform one or more operations or processes described herein. For example, a non-transitory computer-readable medium (e.g., memory 430) may store a set of instructions (e.g., one or more instructions or code) for execution by processor 420. Processor 420 may execute the set of instructions to perform one or more operations or processes described herein. In some implementations, execution of the set of instructions, by one or more processors 420, causes the one or more processors 420 and/or the device 400 to perform one or more operations or processes described herein. In some implementations, hardwired circuitry is used instead of or in combination with the instructions to perform one or more operations or processes described herein. Additionally, or alternatively, processor 420 may be configured to perform one or more operations or processes described herein. Thus, implementations described herein are not limited to any specific combination of hardware circuitry and software.

The number and arrangement of components shown in FIG. 4 are provided as an example. Device 400 may include additional components, fewer components, different components, or differently arranged components than those shown in FIG. 4. Additionally, or alternatively, a set of components (e.g., one or more components) of device 400 may perform one or more functions described as being performed by another set of components of device 400.

FIG. 5 is a flowchart of an example process 500 associated with machine learning model for recommending interaction parties. In some implementations, one or more process blocks of FIG. 5 may be performed by the recommendation system 310. Additionally, or alternatively, one or more process blocks of FIG. 5 may be performed by one or more components of the device 400, such as processor 420, memory 430, input component 440, output component 450, and/or communication component 460.

As shown in FIG. 5, process 500 may include receiving, from a user device, user device interaction data associated with user device interactions between a user and a first subset of a plurality of interaction parties (block 510). For example, the recommendation system 310 (e.g., using processor 420, memory 430, input component 440, and/or communication component 460) may receive, from a user device of a user, user device interaction data associated with user device interactions between the user and a first subset of a plurality of interaction parties, as described above in connection with reference number 105 of FIG. 1A. As an example, the user may remotely perform, via the user device of the user, user device interactions with a first subset of the interaction parties, such as in an online interaction. The recommendation system may receive, from the user device over a network, user device interaction data associated with the user device interactions.

As further shown in FIG. 5, process 500 may include receiving, from interaction party devices of a second subset of the plurality of interaction parties, interaction party device interaction data associated with interaction party device interactions between the user and the second subset of the plurality of interaction parties (block 520). For example, the recommendation system 310 (e.g., using processor 420, memory 430, input component 440, and/or communication component 460) may receive, from interaction party devices of a second subset of the plurality of interaction parties, interaction party device interaction data associated with interaction party device interactions between the user and the second subset of the plurality of interaction parties, as described above in connection with reference number 110 of FIG. 1A. As an example, the user also may perform, via interaction party devices (e.g., PoS terminals or kiosks) interaction party device interactions in person at venues or stores of a second subset of the interaction parties. The recommendation system may receive, from the interaction party devices over the network, interaction party device interaction data associated with the interaction party device interactions.

As further shown in FIG. 5, process 500 may include storing, on a database, the user device interaction data and the interaction party device interaction data as historical interaction data associated with historical interactions of the user, wherein the historical interactions include the user device interactions and the interaction party device interactions (block 530). For example, the recommendation system 310 (e.g., using processor 420 and/or memory 430) may store, on a database, the user device interaction data and the interaction party device interaction data as historical interaction data associated with historical interactions of the user, wherein the historical interactions include the user device interactions and the interaction party device interactions, as described above in connection with reference number 115 of FIG. 1A. As an example, the recommendation system may store the interaction data (e.g., in a user profile database) under a user account associated with the user. The recommendation system may store the interaction data in the user profile database as historical interaction data associated with historical interactions of the user (e.g., the user device interactions and/or the interaction party device interactions).

As further shown in FIG. 5, process 500 may include providing the historical interaction data as input to a machine learning model, wherein the machine learning model is trained using supervised learning and the historical interactions of the user or historical interactions of one or more other users with one or more of the plurality of interaction parties (block 540). For example, the recommendation system 310 (e.g., using processor 420 and/or memory 430) may provide the historical interaction data as input to a machine learning model, wherein the machine learning model is trained using supervised learning and the historical interactions of the user or historical interactions of one or more other users with one or more of the plurality of interaction parties, as described above in connection with FIG. 2.

As further shown in FIG. 5, process 500 may include receiving an output, based on applying the machine learning model to the historical interaction data, that indicates one or more recommended interaction parties based at least in part on one or more factors, wherein the one or more recommended parties are local entities that are local to a geographic location associated with the user (block 550). For example, the recommendation system 310 (e.g., using processor 420, memory 430, input component 440, and/or communication component 460) may receive an output, based on applying the machine learning model to the historical interaction data, that indicates one or more recommended interaction parties based at least in part on one or more factors associated with the user or the user device, wherein the one or more recommended parties are local entities that are local to a geographic location associated with the user, as described above in connection with FIG. 2.

As further shown in FIG. 5, process 500 may include transmitting, to the user device, data indicating the one or more recommended interaction parties (block 560). For example, the recommendation system 310 (e.g., using processor 420, memory 430, and/or communication component 460) may transmit, to the user device, data indicating the one or more recommended interaction parties, as described above in connection with reference number 130 of FIG. 1B. As an example, the recommendation system may transmit the data indicating the similar interaction parties to the user device, which may present information listing the similar interaction parties.

Although FIG. 5 shows example blocks of process 500, in some implementations, process 500 may include additional blocks, fewer blocks, different blocks, or differently arranged blocks than those depicted in FIG. 5. Additionally, or alternatively, two or more of the blocks of process 500 may be performed in parallel. The process 500 is an example of one process that may be performed by one or more devices described herein. These one or more devices may perform one or more other processes based on operations described herein, such as the operations described in connection with FIGS. 1A and 1B. Moreover, while process 500 has been discussed in relation to the systems and components of the preceding figures, process 500 can be performed using alternative systems, additional components, or fewer components. Process 500 should not be limited to being performed with the example systems, hardware, and software explicitly enumerated in the preceding figures.

The foregoing disclosure provides illustration and description, but is not intended to be exhaustive or to limit the implementations to the precise forms disclosed. Modifications may be made in light of the above disclosure or may be acquired from practice of the implementations.

As used herein, the term "component" is intended to be broadly construed as hardware, firmware, or a combination of hardware and software. It will be apparent that systems and/or methods described herein may be implemented in different forms of hardware, firmware, and/or a combination of hardware and software. The actual specialized control hardware or software code used to implement these systems and/or methods is not limiting of the implementations. Thus, the operation and behavior of the systems and/or methods are described herein without reference to specific software code—it being understood that software and hardware can be used to implement the systems and/or methods based on the description herein.

As used herein, satisfying a threshold may, depending on the context, refer to a value being greater than the threshold, greater than or equal to the threshold, less than the threshold, less than or equal to the threshold, equal to the threshold, not equal to the threshold, or the like.

Although particular combinations of features are recited in the claims and/or disclosed in the specification, these combinations are not intended to limit the disclosure of various implementations. In fact, many of these features may be combined in ways not specifically recited in the claims and/or disclosed in the specification. Although each dependent claim listed below may directly depend on only one claim, the disclosure of various implementations includes each dependent claim in combination with every other claim in the claim set. As used herein, a phrase referring to "at least one of" a list of items refers to any combination and permutation of those items, including single members. As an example, "at least one of: a, b, or c" is intended to cover a, b, c, a-b, a-c, b-c, and a-b-c, as well as any combination with multiple of the same item.

No element, act, or instruction used herein should be construed as critical or essential unless explicitly described as such. Also, as used herein, the articles "a" and "an" are intended to include one or more items, and may be used interchangeably with "one or more." Further, as used herein, the article "the" is intended to include one or more items referenced in connection with the article "the" and may be used interchangeably with "the one or more." Furthermore, as used herein, the term "set" is intended to include one or more items (e.g., related items, unrelated items, or a combination of related and unrelated items), and may be used interchangeably with "one or more." Where only one item is intended, the phrase "only one" or similar language is used. Also, as used herein, the terms "has," "have," "having," or the like are intended to be open-ended terms. Further, the phrase "based on" is intended to mean "based, at least in part, on" unless explicitly stated otherwise. Also, as used herein, the term "or" is intended to be inclusive when used in a series and may be used interchangeably with "and/or," unless explicitly stated otherwise (e.g., if used in combination with "either" or "only one of").

What is claimed is:

1. A system, comprising:
   one or more memories; and
   one or more processors, coupled to the one or more memories, configured to:
     provide, to a machine learning model, historical interaction data associated with historical interactions of a user with a plurality of interaction parties;
     receive an output, based on applying the machine learning model to the historical interaction data, that indicates one or more recommended interaction parties that are local entities to a geographic location associated with the user,
     wherein the one or more recommended interaction parties are local entities based on having at least one location within a distance threshold of the geographic location and based on:
       a comparison of a first threshold to a quantity of locations of the one or more recommended interaction parties, or
       a comparison of a second threshold to a revenue of the one or more recommended interaction parties over a timeframe; and
     transmit an indication of the one or more recommended interaction parties.

2. The system of claim 1,
   wherein the one or more processors are further configured to:
     receive the historical interaction data, wherein the historical interaction data includes:
       user device interaction data, associated with user device interactions between a user and a first subset of a plurality of interaction parties via a user device, and
       interaction party device interaction data associated with interaction party device interactions between the user and a second subset of the plurality of interaction parties.

3. The system of claim 1,
   wherein the one or more processors are further configured to:
     store the historical interaction data in a database, wherein providing the historical interaction data to the machine learning model is based on storing the historical interaction data.

4. The system of claim 1,
   wherein the machine learning model is trained using at least a portion of the historical interaction data.

5. The system of claim 1,
   wherein the machine learning model is trained using supervised learning or unsupervised learning.

6. The system of claim 5,
   wherein the machine learning model is trained using the unsupervised learning to determine a cluster of users to which the user belongs, the cluster of users being based on at least one of:
     demographic information of the users,
     socioeconomic statuses of the users, or
     historical interaction data of the users.

7. The system of claim 1,
   wherein the geographic location associated with the user is a current geographic location or an expected geographic location associated with the user.

8. The system of claim 1,
   wherein the plurality of interaction parties are associated with one or more interaction party types, and
     wherein the one or more recommended interaction parties are based at least in part on one or more interaction party types associated with a first subset of the plurality of interaction parties or a second subset of the plurality of interaction parties.

9. The system of claim 1,
   wherein the one or more processors are further configured to:
     determine one or more preferences of the user based at least in part on the historical interaction data, wherein the one or more recommended interaction parties are based at least in part on the one or more preferences of the user.

10. A method, comprising:
    accessing, by a system that includes at least one processor, records of historical interactions of a user with a plurality of interaction parties;
    determining, by the system, one or more recommended interaction parties based on one or more of the plurality of interaction parties,
    wherein the one or more recommended interaction parties are local entities based on having at least one location within a distance threshold of a geographic location associated with the user and based on:

a comparison of a first threshold to a quantity of locations of the one or more recommended interaction parties, or a comparison of a second threshold to a revenue of the one or more recommended interaction parties over a timeframe; and transmitting, by the system, data indicating the one or more recommended interaction parties.

11. The method of claim 10, further comprising:
updating a model, used to determine the one or more recommended interaction parties, based on feedback received from a user device of the user.

12. The method of claim 10,
wherein the one or more recommended interaction parties have one or more commonalities with the one or more recommended interaction parties.

13. The method of claim 12,
wherein the one or more commonalities include average interaction currency amounts, one or more interaction party types, or one or more interaction item types.

14. The method of claim 10, wherein:
the quantity of locations is less than the first threshold, or
the revenue of the one or more recommended interaction parties, over the timeframe, is less than the second threshold.

15. The method of claim 10,
wherein the historical interactions include interactions performed via a user device of the user and interactions performed via interaction party devices of at least a subset of the plurality of interaction parties.

16. A non-transitory computer-readable medium storing a set of instructions, the set of instructions comprising:
one or more instructions that, when executed by one or more processors of a device, cause the device to:
access records of historical interactions of a plurality of users with a plurality of interaction parties;
determine one or more recommended interaction parties based on one or more of the plurality of interaction parties,
wherein the one or more recommended interaction parties are local entities based on having at least one location within a distance threshold of a geographic location, associated with a user of the plurality of users, and based on:
a comparison of a first threshold to a quantity of locations of the one or more recommended interaction parties, or
a comparison of a second threshold to a revenue of the one or more recommended interaction parties over a timeframe; and
transmit an indication of the one or more recommended interaction parties.

17. The non-transitory computer-readable medium of claim 16,
wherein the one or more instructions, that cause the device to determine the one or more recommended interaction parties, cause the device to:
use a machine learning model, trained based on historical training data, to determine the one or more recommended interaction parties based on one or more factors associated with the user.

18. The non-transitory computer-readable medium of claim 16,
wherein the historical interactions of the plurality of users are associated with timestamps, and
wherein a timestamp, of the timestamps, associated with a particular historical interaction, of the historical interactions, is within a time threshold of a current time of day.

19. The non-transitory computer-readable medium of claim 16,
wherein the historical interactions of the plurality of users are associated with interaction amounts, and
wherein the one or more recommended interaction parties are based at least in part on one or more of the interaction amounts.

20. The non-transitory computer-readable medium of claim 16,
wherein one or more interactions, of the plurality of users, are associated with one or more interaction item types, and
wherein the one or more recommended interaction parties are based at least in part on one or more of the interaction item types.

* * * * *